United States Patent [19]

Reisman et al.

[11] 4,328,938

[45] May 11, 1982

[54] ROLL REFERENCE SENSOR

[75] Inventors: Elias Reisman, Orange; S. Kirby Wilson, Ramona; Paul G. M. McManigal, Newport Beach; Lawrence L. Goldberg, Villa Park, all of Calif.

[73] Assignee: Ford Aerospace & Communications Corp., Detroit, Mich.

[21] Appl. No.: 49,531

[22] Filed: Jun. 18, 1979

[51] Int. Cl.³ .................................................. B64G 1/36
[52] U.S. Cl. .................................... 244/3.1; 244/3.21; 244/171
[58] Field of Search ...................... 244/3.1, 3.13, 3.21, 244/166, 171

[56] References Cited

U.S. PATENT DOCUMENTS

| 2,995,749 | 8/1961 | Robinson, Jr. | 244/3.13 |
|---|---|---|---|
| 3,297,948 | 1/1967 | Kohler | 244/166 |
| 3,437,288 | 4/1969 | Do Maulam | 244/3.15 |
| 3,860,199 | 1/1975 | Dunne | 244/3.13 |
| 3,866,859 | 2/1975 | Hill | 244/77 R |
| 3,868,074 | 2/1975 | Hill | 244/77 R |
| 3,873,050 | 3/1975 | Hill | 244/77 R |
| 3,928,801 | 12/1975 | Hill | 324/160 |
| 3,951,358 | 4/1976 | De Lano et al. | 244/3.15 |
| 3,979,089 | 9/1976 | Miller et al. | 244/3.21 |
| 3,990,659 | 11/1974 | Moore et al. | 244/3.14 |

FOREIGN PATENT DOCUMENTS 1100957 1/1968 United Kingdom ............... 244/3.13

Primary Examiner—Sal Cangialosi
Attorney, Agent, or Firm—Paul K. Godwin, Jr.; Clifford L. Sadler

[57] ABSTRACT

A technique for sensing both the earth generated electromagnetic and electrostatic fields is employed on board a remotely guided spin-stabilized projectile or missile in order to accurately determine a vertical reference direction and provide for proper response to received guidance information during the entire flight trajectory.

12 Claims, 8 Drawing Figures

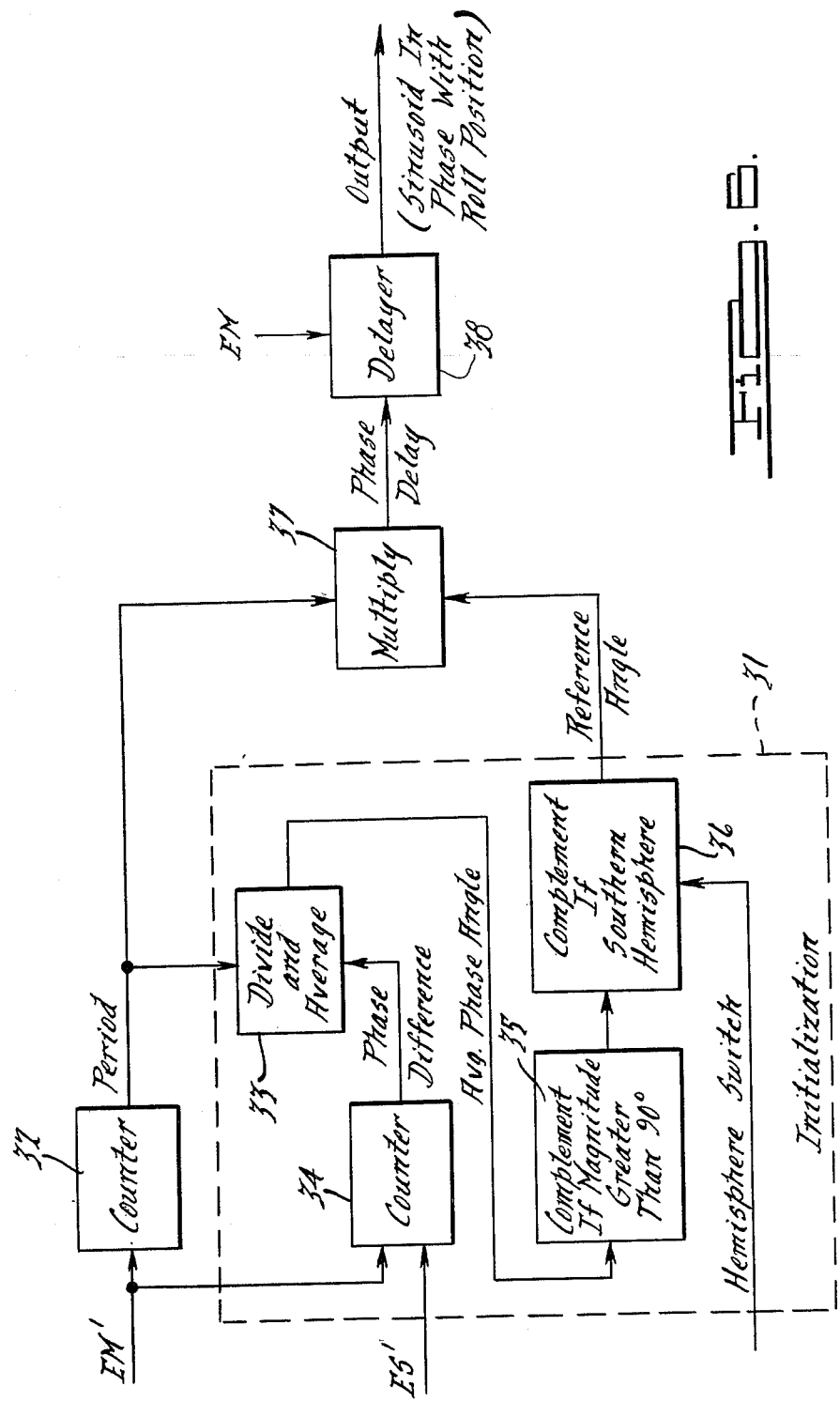

ROLL REFERENCE SENSOR

BACKGROUND OF THE INVENTION

1. Field of the Invention

The present invention is in the field of remote control systems for projectiles and missiles and more specifically lies in the area of providing on-board reference information to spin stabilized projectiles and missiles while in flight.

2. Description of the Prior Art

In the field of remote guided projectiles, which generally rely on spin stabilization over their flight trajectories, it is essential that the projectiles be instantaneously aware of the referential environment in which they are traveling, in order that received control (steering) information may be properly responded to by the projectile. Systems providing such reference information in the past have included: sun sensors; sky sensors; horizon sensors; gyroscopes; electrostatic field sensors; and electromagnetic field sensors in combination with ground station transmitted initialization information. Each of the above prior art systems have inherent deficiencies which limit universal acceptance in this field.

Systems which employ sun, sky, or horizon sensors are, of course, adversely affected by clouds, changing times of the day, launch location, flight direction and darkness. Therefore, such systems require sophisticated circuitry and skilled operators to set up the various parameters in order to obtain accurate and usable results.

Systems which employ gyroscopes are, of course, susceptible to mechanical damage due to pre-flight handling, high-G launch forces and flight vibrations. In addition, gyros generally require significantly large power sources and, therefore, present weight and space factors which must be accounted for with larger propulsion systems for a given payload.

Systems which employ electrostatic sensors, such as that disclosed in U.S. Pat. No. 3,990,659, have been developed which detect and generally provide unambiguous signal outputs, that are indicative of the gradient of the earth generated electrostatic field. The unambiguous signals provide a direct source by which the vertical plane and the "up" or "down" directions within that plane may be detected at any instant. However, under certain atmospheric anomalies, such as those which occur in thunderstorms, the electrostatic field gradient may become reversed in areas through which the flight path trajectory traverses. When such field reversal occurs, the electrostatic sensors will produce a signal that indicates an oppositely oriented reference direction to the guidance system of the projectile.

Systems which employ electromagnetic field sensors, such as that described in U.S. Pat. No. 3,860,199, have been developed which sense the electromagnetic field that the spinning missile is flying through. That system provides an ambiguous signal output from the on-board electromagnetic sensors and is continuously compared with a ground station electromagnetic field sensor signal. The ground station electromagnetic sensor signal is transmitted to the projectile in order that the on-board signal may be compared and a vertical reference direction may be determined on board the missile. Since electromagnetic field sensors produce signals that are inherently ambiguous (i.e., a defined directional reference cannot be determined by mere observance of the polarity of the signal), a rather complicated technique is disclosed in the aforementioned patent to initially determine the vertical "up" reference direction at the launch site and then optically transmit this information to the projectile rotating at an entirely different rate, which changes with time. The main disadvantage of such a system appears to be the rather complicated algorithm which must be performed both on board the projectile and at the launch site in order to achieve proper control. This, of course, is costly and may present reliability problems that cannot be tolerated in the field.

SUMMARY OF THE INVENTION

In contrast to the above approaches for determining a vertical "up" directional reference in a spinning body (i.e., projectile or missile), the present invention achieves total on-board roll referencing without relying on ground station data link updates and without any moving mechanical parts.

The present invention employs a pair of electrostatic field sensors and an electromagnetic field sensor in combination to achieve a totally on-board roll reference system that is fully responsive without regard to flight path direction, and fully compensates for any changes to electrostatic field reversals which may occur in the atmosphere. Furthermore, the present invention has an advantage in that proper operation does not require human operator assistance or knowledge as to launch direction or geographic location, with the exception of knowing that the launch location is in either the Northern or Southern Hemisphere.

In the unique combination of the present invention, the individual limitations of the respective electromagnetic sensor system and electrostatic field sensor system are overcome and a more reliable system results.

Electronic signal processing is included to determine the phase angle between the electromagnetic and electrostatic sensor signals, and to correct the phase angle should the electrostatic field be reversed due to atmospheric anamolies. In operation, under normal circumstances, the electrostatic sensor signal is processed along with the electromagnetic sensor signal for several revolutions of the flight. Then the electromagnetic sensor signal is initialized based upon the phase angle existing between its ambiguous signal and the unambiguous electrostatic sensor signal which indicates the vertical "up" direction. Initializing the electromagnetic sensor signal converts the normally ambiguous signal to one that is unambiguous, in that by measuring the phase angle between the electrostatic sensor signal and the electromagnetic sensor signal, the electromagnetic sensor signal can be adjusted by the amount of the phase angle to indicate the vertical "up" direction.

It is therefore, an object of the present invention to provide an on-board roll reference sensor system for a spin-stabilized body that is completely self-contained.

It is another object of the present invention to provide a roll reference sensor system for projectiles that is capable of withstanding high-G gun launches.

It is a further object of the present invention to provide an on-board roll reference sensor that initially detects both electromagnetic and electrostatic fields and corrects for electrostatic field reversals.

It is a further object of the present invention to provide a roll reference sensor system that is simplified to a point which makes it economical enough to use with expendable projectiles and requires minimal operator set up.

It is a still further object of the present invention to provide a roll reference sensor system that is lightweight, rugged, accurate and reliable in all tactical environments.

BRIEF DESCRIPTION OF THE DRAWINGS

FIG. 6 is a functional block diagram of the processor unit shown in FIG. 4.

DESCRIPTION OF THE PREFERRED EMBODIMENT

Figure 1A:
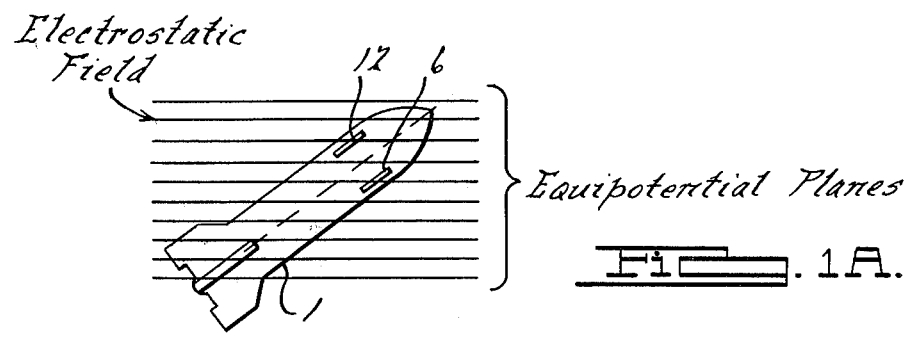
FIG. 1A schematically illustrates electrostatic sensors on a spin-stabilized projectile traveling through an electrostatic field.
Figure 2A:
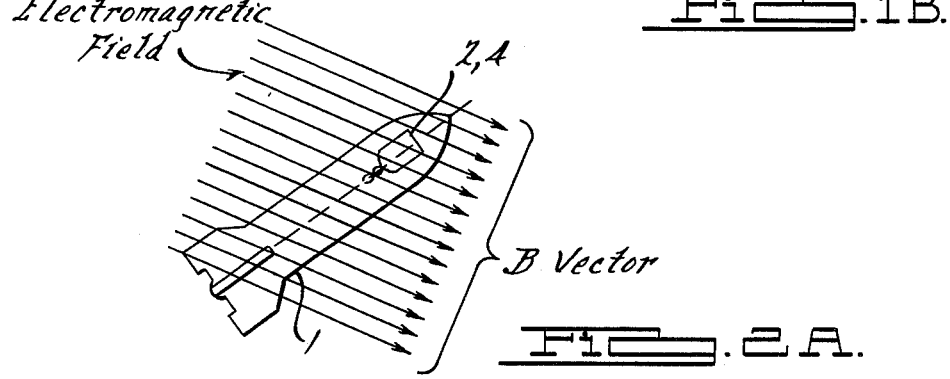
FIG. 2A schematically illustrates an electromagnetic coil sensor on a spin-stabilized projectile traveling through an electromagnetic field.

FIGS. 1A and 2A respectively illustrate an electrostatic potential field and an electromagnetic field in the atmosphere. It is known that electrostatic fields comprise equal-potential surfaces which are generally parallel over the earth's surface, an electrostatic gradient exists normal to the earth's surface and a vertical reference plane may sometimes be determined therefrom. FIG. 1A typically illustrates the electrostatic field gradient, which usually ranges from 100 to 200 V per meter. In contrast, the earth generated electromagnetic field illustrated in FIG. 2A is dependent upon latitude location since the magnetic flux lines B are conventionally assumed to converge near the poles and run parallel at the equator. For this reason, it is known that an electromagnetic spinning coil type sensor will produce a sinusoidal output wave which varies in peak amplitude as its spin axis changes direction and varies in phase as its latitudinal location is changed for a constant spin rate. Therefore, the direction of the electromagnetic field flux vectors B in FIG. 2A is only exemplary of one latitudinal location.

Figure 1B:
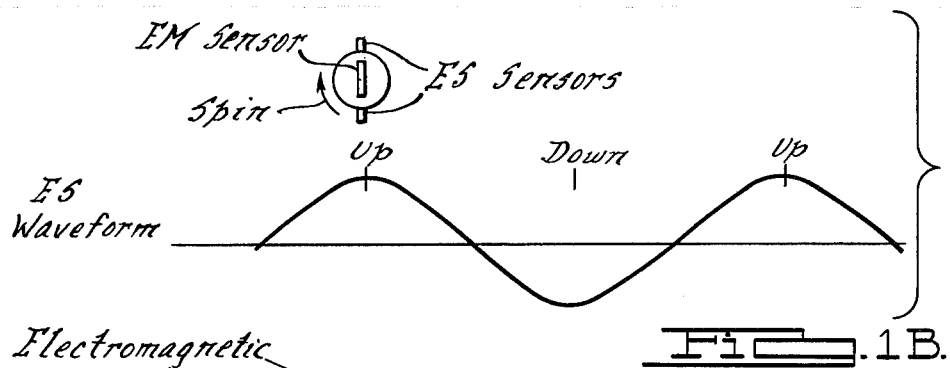
FIG. 1B illustrates a typical waveform generated by the electrostatic sensors as shown in FIG. 1A.

A projectile 1 is shown in FIG. 1A containing electrostatic field sensor plates 6 and 12. It is assumed that the missile 1 is spin stabilized along an axis S and therefore the potential difference existing between the two electrostatic field sensor plates varies as the respective plates traverse the equal potential surfaces. For reference purposes, the electrostatic sensor plate 12 is designated as being located in the "up" position while the oppositely located electrostatic sensor plate 6 is defined to be located at the "down" position of the missile. The "ES" waveform shown in FIG. 1B is typical of what one would expect from electrostatic sensors mounted upon a spinning body when an electrostatic potential exists between the two sensors.

In FIG. 2A a missile 1 is shown traversing an earth generated electromagnetic field and is shown with a rectangular coil designated as 2,4. In later drawings the coil will be shown as being made up of two separate windings which are designated as 2 and 4 respectively. The rectangular coil cuts the earth's magnetic flux lines and thereby generates a sinusoidal voltage.

Figure 2B:
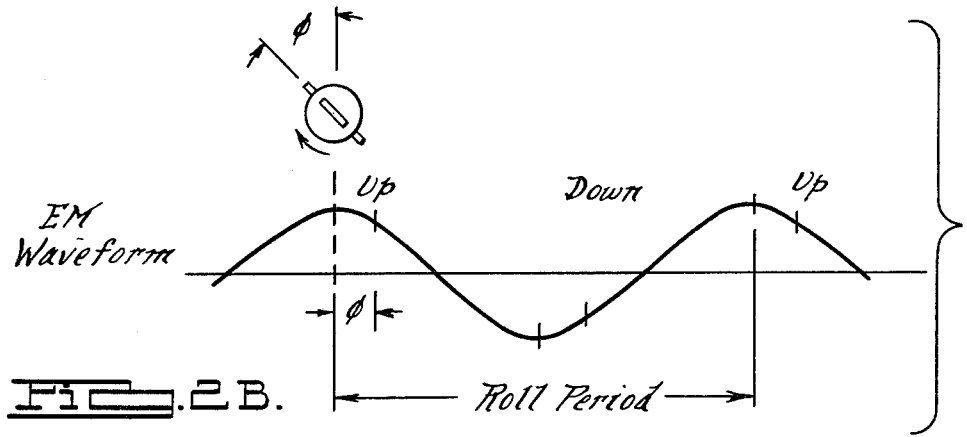
FIG. 2B illustrates an electromagnetic waveform of the type generated by the electromagnetic field sensors shown in FIG. 2A.

The EM waveform shown in FIG. 2B illustrates the fact that the waveform output from the electromagnetic field sensor has a peak amplitude which is related to the number of flux lines being cut rather than a vertical reference direction. In other words, although the EM waveform is at the same frequency as the ES waveform (spin frequency) there is a phase difference between the two signals designated as a phase angle $\phi$. In addition, the phase angle $\phi$ changes as the latitudinal location of the missile changes.

As mentioned above, the present invention is intended for use in remote controlled projectiles, such as beam rider types, which are subjected to heavy G-loading at launch. Therefore, the various electrostatic and electromagnetic sensors have been designed to be immune to such loading and are mounted flush on the surface of the projectile.

Figure 3:
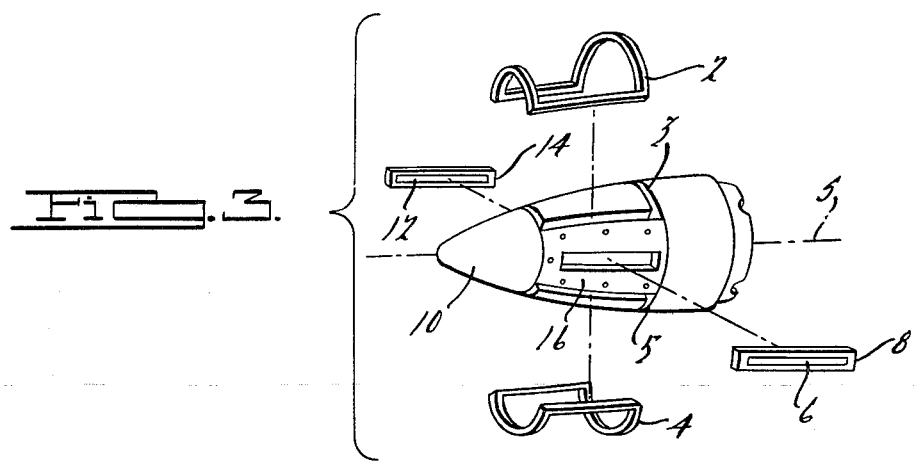
FIG. 3 is an exploded view of one embodiment of the present invention showing the mounting of the particular sensors.

In FIG. 3, the sensors are shown in an exploded format. The electrostatic sensors comprise conductive plates 6 and 12 mounted on opposite sides of the nose cone 10 of the projectile. The conductive plates 6 and 12 are mounted diametrically opposite on insulating blocks 8 and 14 respectively. The electromagnetic field sensor comprises coils 2 and 4 which are wound in oppositely positioned rectangular troughs 3 and 5 so as to be flush with the surface of the nose cone 10.

Figure 4:
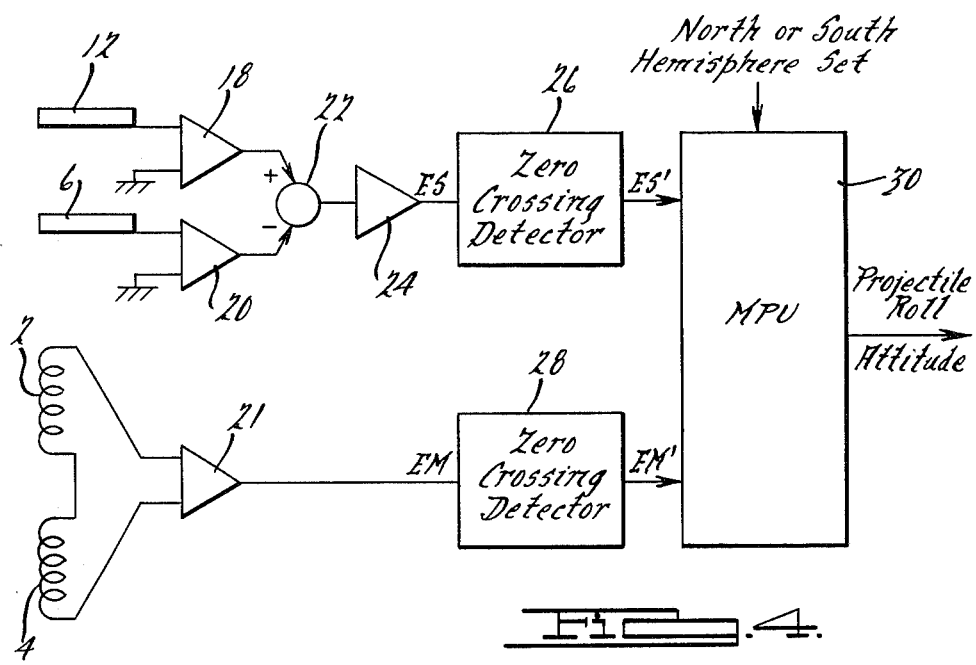
FIG. 4 is a block diagram illustrating the signal processing circuitry for the present invention.

In FIG. 4, the electrostatic field sensors 6 and 12 are respectively connected to high impedance differential type preamplifiers 20 and 18. In this way, any uniform anamolies caused by speed associated phenomena, atmospheric dust, etc. will be cancelled out. The outputs of the respective preamplifiers 20 and 18 are fed to a summing network 22 and through an amplifier 24 where the resultant ES signal, such as that shown in FIG. 1B, is fed into a zero crossing detector 26. The function of the zero crossing detector 26 is, or course, to sharpen the polarity transition of the ES sinewave and thereby produce definitive reference pulses for further processing. The output signal of the zero crossing detector 26 is designated as ES' and is shown as a square wave in FIG. 5. This output is fed to a microprocessor unit 30, which is explained in further detail with reference to FIG. 6. The electromagnetic field sensor comprises coils 2 and 4 and is also shown in FIG. 4 wherein the coils are connected in series and fed into a high impedance differential type preamplifier 21. The electromagnetic field sensor produces an output EM such as that shown in FIG. 2B. The EM waveform is fed to a zero crossing detector 28 and a square wave output signal, designated as EM' and shown in FIG. 5, is fed to the microprocessor unit 30.

Figure 5:
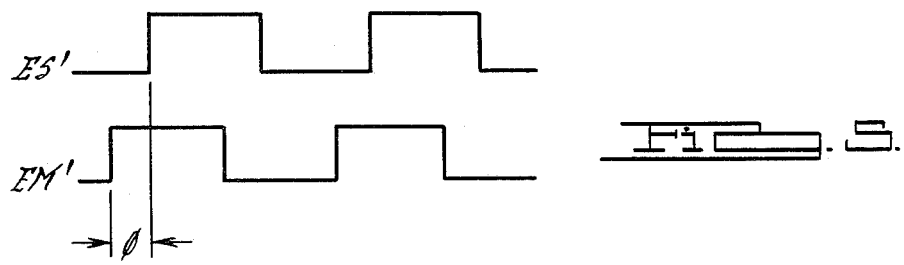
FIG. 5 illustrates two square waveforms output from zero crossing detectors illustrated in the circuits shown in FIG. 4.

As can be seen from FIGS. 1B, 2B and 5, there is a definite phase angle difference between the waveforms generated by the electrostatic sensors and the electromagnetic sensors. This phase angle is generally designated as angle $\phi$. In this example, the zero crossing detectors 26 and 28 produce output signals which vary from a lower level to a higher level when their respective input waveforms go from a negative potential to a positive potential; and from the higher level to the lower level when the waveforms go from a positive potential to a negative potential. The microprocessor unit 30 digitally processes the square wave signals by measuring the phase angle between the electrostatic field and the electromagnetic field and then correcting the electromagnetic field signal to be indicative of the "up" direction in the vertical reference plane. If, due to atmospheric anomolies, the trajectory path of the projectile passes through a reversed electrostatic field, the phase angle measured between the electrostatic sensor signal and the electromagnetic sensor signal changes so dramatically that the system compensates and takes the complement of that angle so that the electromagnetic sensor signal can be continually updated as it changes direction and latitude position.

FIG. 6 illustrates a detailed functional block diagram of the microprocessor 30. An initialization section 31 is utilized at the beginning of the flight to determine the phase difference between the two measured field signals and store that angle as a reference. A counter 32 receives the EM' signal and measures the time interval between zero crossings. The output of the counter 32 is therefore proportional to the period of the EM signal. Similarly, the EM' signal is also fed to a counter 34. The EM' signal activates the counter 34 which remains on until the ES' signal is received through another input of the counter 34. Therefore, the output from the counter 32 has a value proportional to the period of the electromagnetic signal and the output from the counter 34 has a value which indicates a phase difference between the two signals. As part of the initialization section 31, the period value and the phase difference values are fed to a divide and average network 33 wherein those values are averaged over several cycles immediately after launch. The phase difference values are then divided by the period values resulting in an average phase angle value. Due to the configuration of the electrostatic sensors 6 and 12 with respect to the electromagnetic field coils 2 and 4 and the designation that one of the electrostatic field sensors (12) is the "up" sensor in the Northern Hemisphere for a normal electrostatic field, the phase angle between the two signals will be less than ±90°. If the phase angle is measured as being greater than ±90°, the initialization circuit assumes that the ES field is inverted and correction is made to the phase angle by the complement network 35, which then outputs the complement of the measured average phase angle.

If the launch is conducted in the Southern Hemisphere, the present configuration of electrostatic sensors and electromagnetic field sensors will produce signals in which the average phase angle indicates the opposite reference direction. This is due to the differences in the electromagnetic field flux orientations that are found in those two hemispheres. Therefore, the complement network 36 is included to gate the output of network 35 through unaffected, when the hemisphere switch is set in the NH position; and to provide the complement of the output of network 35, when the hemisphere switch is set in the SH position.

Hemispherical location is the only input that needs to be initially set in the system at launch. Therefore, for projectiles normally produced for use in the Northern Hemisphere, those projectiles may be set by the manufacture with a hemisphere switch in the NH position and may be set to the SH position if the projectiles are subsequently sent for use in the Southern Hemisphere. In the event the hemisphere switch is set in the SH position, the complement network 36 outputs the complement of the corrected phase angle input from the complement network 35. The output signal of the complement network 36 has a value which is termed the reference angle and is also considered as the output from the initialization network 31. The reference is stored in the store-multiply network 37 for the remainder of the flight.

After the initialization period, each subsequent zero crossing of the EM' signal generates new period information via counter 32. The period information is multiplied by the stored reference angle in network 37 to produce a phase delay value signal. The phase delay value signal is fed to a delay network 38 where the incoming electromagnetic signal EM is either lagged or led according to the phase value to produce a sinusoid in phase with the correct roll reference position (i.e., the peak value of the EM signal occurs when the projectile correspondingly rolls through the vertical plane). This signal is then used by the guidance system—the same as a conventional gyroscopic signal output would be used—as a roll reference by the guidance system which is then able to correctly effect steering changes in response to information received from the guidance beam.

It is apparent that many modifications and variations may be affected without departing from the scope of the novel concept of this invention, therefore, it is intended by the appended claims to cover all such modifications and variations which fall within the true spirit and scope of the invention.

We claim:

1. A vertical orientation sensing system in a body spinning about a first axis transverse to the vertical comprising:
   first means mounted on said body for unambiguously detecting earth generated electrostatic field and generating a sinusoidal voltage as said body spins;
   second means mounted on said body for ambiguously detecting earth generated electromagnetic field and generating a second sinusoid voltage as said body spins;
   third means connected to receive said first and second sinusoidal voltages to determine the phase angle therebetween and to correct said second sinusoidal voltage by the amount of said determined phase angle.

2. A vertical orientation sensing system as in claim 1, wherein said detecting means comprises a pair of elongated electrode plates mounted parallel to said axis and electrically insulated from said body and each other.

3. A vertical orientation sensing system as in claim 1, wherein said electromagnetic field sensing means includes a pair of induction coils oppositely mounted on said body to spin therewith concentric with said spin axis.

4. A vertical orientation sensing system as in claim 3, wherein said detecting means comprises a pair of elongated electrode plates mounted parallel to said axis and electrically insulated from said body and each other.

5. A vertical orientation sensing system as in claim 1, wherein said electromagnetic field sensing means includes an induction coil formed to be mounted on said body to spin therewith concentric with said spin axis.

6. A vertical orientation sensing system as in claim 5, wherein said detecting means comprises a pair of elongated electrode plates mounted parallel to said axis and electrically insulated from said body and each other.

7. A vertical orientation sensing system as in claim 1, wherein said third means includes:
   means for measuring a proportional value of the period of each cycle of said second sinusoidal voltage;

means for measuring a phase difference value between said first and second sinusoidal voltages;

means for accumulating said measured proportional values and said phase difference values over a predetermined number of measurements and dividing said accumulated phase difference values by said accumulated proportional value to produce an average phase angle value output signal; and means for correcting said sinusoidal voltage by said average phase angle value.

8. A vertical orientation sensing system as in claim 7, wherein said third means further includes means for monitoring said average phase angle and producing the complement of said average phase angle whenever said phase angle is greater than ±90°.

9. A vertical orientation sensing system as in claim 8, wherein said third means further includes means for receiving said average phase angle value and switchable between North and South Hemispherical states which respectively produce outputs of said average phase angle value and the complement of said average phase angle value.

10. A method of determining the vertical plane in a body spinning about a first axis transverse to the vertical plane comprising the steps of:

unambiguously detecting an earth generated electrostatic field and generating a first sinusoidal voltage having peak values occurring coincidentally when a predetermined portion of said spinning body traverses said vertical plane;

detecting an earth generated electromagnetic field and generating a second sinusoidal voltage;

comparing said first and second sinusoidal voltages and determining both the phase angle therebetween and the complement of said phase angle;

adjusting the phase of said second sinusoidal voltage by said determined phase angle so that the peak value of said second sinusoidal voltage occurs coincidentally when the predetermined portion of said spinning body traverses said vertical plane.

11. A method as in claim 9 and further including the step of monitoring said phase adjusted second sinusoidal voltage to controllably determine the orientation of said vertical plane with respect to said spinning body.

12. A method of initializing signals generated by an earth generated magnetic field sensing system to provide an unambiguous indication of a vertical reference direction in a spinning body containing the said electromagnetic sensing system comprising the steps of:

sensing an earth generated electrostatic field on said spinning body;

generating an unambiguous sinusoidal signal indication of the strength and polarity of said electrostatic field;

comparing said signals generated by said electromagnetic field sensing system with said unambiguous sinusoidal signal and determining the phase angle between said compared signals; and correcting said signals generated by said electromagnetic field sensing system by said phase angle to achieve an unambiguous indication of the vertical reference direction with respect to said spinning body.

* * * * *